(12) United States Patent
Peng

(10) Patent No.: US 10,822,470 B2
(45) Date of Patent: Nov. 3, 2020

(54) POLYOLEFIN MATERIALS WITH REDUCED OXYGEN PERMEABILITY

(75) Inventor: Lichh R. Peng, Littleton, CO (US)

(73) Assignee: Johns Manville, Denver, CO (US)

(*) Notice: Subject to any disclaimer, the term of this patent is extended or adjusted under 35 U.S.C. 154(b) by 746 days.

(21) Appl. No.: 13/607,357

(22) Filed: Sep. 7, 2012

(65) Prior Publication Data

US 2014/0072808 A1    Mar. 13, 2014

(51) Int. Cl.
| | | |
|---|---|---|
| C08L 23/08 | (2006.01) | |
| C08K 3/013 | (2018.01) | |
| E04D 5/10 | (2006.01) | |
| E04D 12/00 | (2006.01) | |
| E04D 5/06 | (2006.01) | |
| B32B 27/32 | (2006.01) | |
| B32B 7/12 | (2006.01) | |
| B32B 27/20 | (2006.01) | |
| B82Y 30/00 | (2011.01) | |

(52) U.S. Cl.
CPC .............. *C08K 3/013* (2018.01); *B32B 7/12* (2013.01); *B32B 27/20* (2013.01); *B32B 27/32* (2013.01); *B32B 27/325* (2013.01); *E04D 5/06* (2013.01); *E04D 5/10* (2013.01); *E04D 12/002* (2013.01); *B32B 2250/242* (2013.01); *B32B 2262/101* (2013.01); *B32B 2262/105* (2013.01); *B32B 2264/102* (2013.01); *B32B 2264/104* (2013.01); *B32B 2272/00* (2013.01); *B32B 2307/304* (2013.01); *B32B 2307/4026* (2013.01); *B32B 2307/558* (2013.01); *B32B 2307/712* (2013.01); *B32B 2307/7244* (2013.01); *B32B 2419/06* (2013.01); *B82Y 30/00* (2013.01); *Y10T 428/31547* (2015.04); *Y10T 428/31938* (2015.04)

(58) Field of Classification Search
CPC .......... B32B 7/12; B32B 27/325; B32B 27/32; B32B 27/20; E04D 5/06; E04D 12/002; E04D 5/10; C08L 23/02; C08K 3/013
See application file for complete search history.

(56) References Cited

U.S. PATENT DOCUMENTS

| | | | |
|---|---|---|---|
| 6,511,756 B1 * | 1/2003 | Obuchi | ................. C08G 61/08 156/244.11 |
| 6,632,868 B2 | 10/2003 | Qian et al. | |
| 6,838,508 B2 | 1/2005 | Hsiao et al. | |
| 7,776,943 B2 | 8/2010 | Scott et al. | |
| 7,888,419 B2 | 2/2011 | Cooper et al. | |

(Continued)

OTHER PUBLICATIONS

Amin Mirzadeh, Mehrdad Kokabi: "The effect of composition and draw-down ratio on morphology and oxygen permeability of polypropylene nanocomposite blown films," European Polymer Journal, Sep. 2007 (Sep. 2007), pp. 3757-3765. vol. 43.

*Primary Examiner* — Samir Shah
(74) *Attorney, Agent, or Firm* — Robert D. Touslee

(57) ABSTRACT

Polymer compositions with reduce oxygen permeability are described. The polymer compositions may include one or more polyolefin polymers, and a nanoparticle filler. The nanoparticle filler represents about 2 wt. % to 5 wt. % of the weight of the polymer composition and reduce the oxygen permeability of the composition by about 20% or more. Also described are roofing systems that may include an insulation layer and a thermoplastic polyolefin layer made using the polymer compositions to protect the insulation layer from weather degradation.

20 Claims, 5 Drawing Sheets

(56) References Cited

U.S. PATENT DOCUMENTS

2006/0260237 A1* 11/2006 Griffin et al. .................. 52/409
2007/0149683 A1    6/2007 Campbell et al.
2007/0287783 A1* 12/2007 Campbell ........... C08L 23/0815
    524/405
2009/0318597 A1* 12/2009 Squire et al. ................. 524/261
2010/0093912 A1    4/2010 Kwak et al.
2011/0160345 A1    6/2011 Cooper et al.
2011/0172334 A1*  7/2011 Qian ........................ C08L 9/00
    524/91
2011/0240064 A1* 10/2011 Wales et al. ................... 134/26

* cited by examiner

POLYOLEFIN MATERIALS WITH REDUCED OXYGEN PERMEABILITY

CROSS-REFERENCES TO RELATED APPLICATIONS

Background of the Invention

Olefin-based polymers like polyethylene and polypropylene can be formed into films that are impermeable to moisture. Consequently, these polyolefin films have found use in liquid storage containers, bags, and wraps for food and garbage, among other uses. Unfortunately, the films are also prone to degradation over time from exposure to oxygen in the air and UV rays from sunlight and other light sources. Eventually, the degradation can cause the films to become brittle and for cracks that result in leaks to complete ruptures of a containers contents.

Olefin polymer makers have introduced stabilizers to the films such as anti-oxidants and UV light absorbing pigments to reduce the rate of degradation and increase the useful lifespan of articles made with the films. While these stabilizers have had some success reducing the rate of film degradation from sunlight exposure and exposure to atmospheric oxygen, there is still a desire in the marketplace to find additives that mil slow these degradation processes even further. The need is especially acute for articles that face constant or near constant outdoor exposure to sunlight, and seasons of high heat and humidity. Thus, there is still a need to develop new formulations of olefin polymer materials that can withstand outdoor elements for many changes of seasons before becoming weathered to the point of needing replacement. These and other challenges are addressed in the present application.

BRIEF SUMMARY OF THE INVENTION

Polymer compositions are described that combine polyolefin polymers with nanoparticle fillers that significantly reduce the oxygen permeability of polymer nanocomposite films made with the compositions. The reduced oxygen permeability reduces oxygen degradation in the films and increases their useful lifespan. The films may be used as building material components, among other uses. For example, the films may be formed into protective membranes and attached to underlying building materials to protect the materials from weathering by heat, moisture, and sunlight.

It has been observed that a sharp reduction in the oxygen permeability can be achieved over a relatively narrow concentration range of the nanoparticle filler for the present combination of polymers and fillers. This steep reduction in oxygen permeability is observed when the nanocomposite filler ranges from about 2 wt. % to 5 wt. % of the total weight of the polymer composition. Inside this concentration range, oxygen permeability can drop by 20% or more (e.g., 40%) compared to the same composite film, including other fillers, that lack a nanoparticle filler. Outside the range, oxygen permeability tends to flatten out with relatively little change in oxygen permeability (e.g., 1-2%) with significant changes in nanoparticle filler concentration. Thus, increasing the nanoparticle filler concentration substantially above 5 wt. % in the present polymer compositions may add to the film's cost without significant further reduction in the film's oxygen permeability.

Embodiments of the invention include polymer compositions with reduced oxygen permeability. The compositions may include one or more polyolefin polymers, and 2 wt. % to 5 wt. % of a nanoparticle filler. The nanoparticles in the filler can reduce the oxygen permeability of the polymer composition by about 20% or more compared to an equivalent composition that lacks the nanoparticles.

Embodiments of the invention further include polymer nanocomposites. The nanocomposites may be formed into a film that includes a thermoplastic polyolefin matrix and a nanoparticle filler. The nanoparticle filler may represent 2 wt. % to 5 wt. % of the polymer nanocomposite, and can reduce the oxygen permeability of the polymer composition by about 20% or more.

Embodiments of the invention still further include roofing systems that have a nanoparticle-containing thermoplastic polyolefin (TPO) film layer. The roofing systems may include an insulation layer positioned underneath the TPO film layer to protect the layer from weather degradation. The TPO layer may include a thermoplastic polyolefin matrix and a nanoparticle filler that is 2 wt. % to 5 wt. % of the TPO layer. The nanoparticle filler can reduce the oxygen permeability of the TPO layer by about 20% or more to reduce the rate of degradation of the layer by atmospheric oxygen and increase its lifespan. The roofing system may also optionally include a roofing board layer positioned between the insulation layer and the TPO layer.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel may be associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Figure 1:
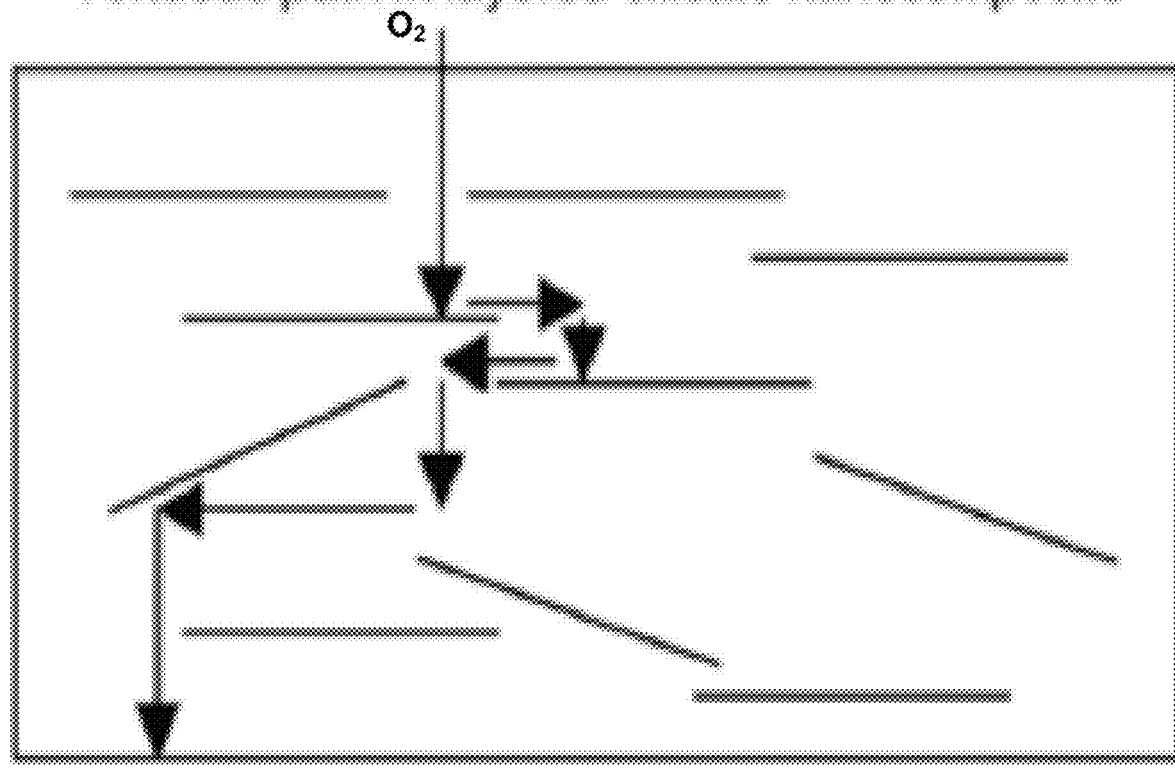
FIG. 1 shows a simplified drawing of tortuous paths oxygen molecules are forced to take through the present polymer nanocomposites due to the presence of the nanoparticles.

The present polymer compositions include one or more thermoplastic polyolefin compounds and nanoparticles that can be made into polymer nanocomposites with reduced oxygen permeability. While not wishing to be bound to any particular theory, it is believed that the nanoparticles create barriers in the path of oxygen molecules ($O_2$) traveling through the polymer nanocomposite. This causes the oxygen to take a tortuous path through the nanocomposite, as shown in FIG. 1, which slows its permeability rate into and through the bulk polymer of the nanocomposite. FIG. 1 shows the nanoparticles as platelets viewed from the side, and the tortuous paths the oxygen molecules must take as they traverse the impermeable surfaces of the platelets.

The decrease in oxygen permeability through the polymer matrix of the nanocomposite reduces the supply of oxygen to sites in the matrix where the oxygen can react with the polymer and degrade the mechanical integrity of the nanocomposite film. Thus, the reduction in oxygen permeability may be correlated to a reduction in the degradation of the film and an increase in its lifespan as a weather protective layer for roofing materials and siding, among other applications.

The nanoparticles can replace some or all of the conventional stabilizers added to polymer compositions to slow the degradation of the composite caused by oxidation. These conventional stabilizers are typically added to the polymer melt that forms the polymer matrix of the composite and may include compounds that bind with the free oxygen diffusing though the polymer, the reactive oxygen species produced from the diffusion oxygen, and/or the sites were the polymer is oxidized or otherwise damaged by the oxygen. In conventional composites, the stabilizers may be added at, for example, about 2 wt. % to 5 wt. % of the weight of the polymer resin, and the concentration of this stabilizer may be reduced, in some instances to 0 wt. %, by substitution with the nanoparticles. The stabilizers may also include compounds that absorb ultra-violet radiation before these highly energetic rays are absorbed by and disrupt chemical bonds in the polymer matrix of the nanocomposite.

Exemplary Polymer Compositions

The present polymer compositions may include one or more types of olefins capable of polymerizing to make the polymer matrix of the polymer nanocomposite. Exemplary olefins may include ethylene, propylene, butene, isobutene, pentene, hexene, heptene, octene, nonene, decene, etc. For larger olefins (i.e., butene and larger numbers of carbon) the olefins may be alpha-olefins that have the C=C double bond at the 1-carbon position, and/or may include β-, γ-, δ-, ε-, etc., olefins that have the C=C double bond located at other positions on the carbon backbone. The olefins may also include dienes, trienes and higher polyenes that have two or more C=C double bonds in the olefin. Exemplary olefins may include unsubstituted olefins (e.g., n-alkenes) consisting of carbon and hydrogen, and substituted olefins where one or more hydrogens on the olefin are substituted with a more complex moiety, such as a alkyl group, an aromatic group, an amine group, etc.

The present olefin polymers used in the polymer nanocomposites may include thermoplastic olefins (TPOs). TPOs may include olefin polymers such as polyethylene (PE) and polypropylene (PP), among other olefins. The olefin polymers may be primarily or exclusively made from a single olefin (e.g., ethylene, propylene, etc.) or may be a copolymer made from two or more types of olefins. TPOs may also include polymer blends of single olefin polymers or copolymers that are melt mixed into a single TPO composition. The melt blended polymers may also be referred to as copolymers, but distinguished from copolymers that are formed from the polymerization of two or more olefin monomers incorporated into the polymer backbone of the TRO chains.

The TPOs may also include monomers, oligomers, and polymers in addition to olefins such as PE and PP. For example, halogenated olefins such as polyvinyl chloride may be added for products made with increased stiffness. In addition, more flexible elastomeric polymers may be included in the TPO composition, such as ethylene propylene rubber (EPR) and/or ethylene propylene diene monomer (EPDM), among other more elastomeric polymers. The elastomeric polymer component can impart increased impact strength (especially at low temperatures), and/or increased heat resistance, depending on how the TPO is formulated. In some instances, the relative amount of the elastomeric polymer is about 20 wt. % or more of the total weight of the TPO polymer.

The TPO polymers may also include cyclic olefins that include a ring structure in the olefin. For example, norbornene, tetracyclodecene, tricyclodecene, dicyclopentadiene, hexacyclaheptadecene, cyclopropene, cyclobutene, cyclopentene, cyclohexene, cycloheptene, cyclooctene; cyclopentadiene; ethylidene norbornene, and vinylcyclohexene may be used as cyclic olefins in the present compositions.

The cyclic olefins may be included in the TPO as cyclic olefin copolymers (COCs). In some instances. COCs are formed during the copolymerization of an acyclic olefin (e.g., polypropylene) with a cyclic olefin to make a random copolymer where the more orderly polyolefin chain includes a random or statistical distribution of the cyclic olefin monomers. With proper control of the polymerization conditions, the cyclic olefins can cluster between longer stretches of the acyclic olefin backbone to form a block-like or block copolymer. In additional instances, COCs may be blended with additional olefin polymers (e.g., thermoplastic olefins) in a polymer melt. Typically, the COCs are added at about 2 wt. % to about 5 wt. % of the total polymer melt.

COCs have been observed to further reduce oxygen permeability in polymer composites, as well as increase heat seal strength. Exemplary COCs may include the combinations and blends of acyclic olefins such as ethylene and/or propylene with cyclic olefins like norbornene (8,9,10-trinorborn-2-ene) and/or tetracyclododecene (1,2,3,4,4a,8,8a-octahydro-1,4,5,8-dimethanonaphthalene).

The present polymer compositions also include a nanoparticle filler. Exemplary nanoparticle fillers may include one or more of nanoclays, nanotubes, and metal-oxide nanoparticles, among other nanoparticle fillers. The nanoclays may include phyllosilicates such as smectite days that include a plurality of very thin platelets with thickness on the order of a nanometer. The clays can be treated with incalants that penetrate between the platelet layers and increase their interlaminar spacing. When the clay is sufficiently intercalated, it may be exposed to mixing and/or mechanical shearing with solvents, olefin monomers, and/or olefin polymers to exfoliate and disperse the platelets in the polymer matrix. The dispersed platelets in the olefin polymer matrix are sometimes referred to as organoclays.

The incalants may include organic molecules and ions that have a polar, hydrophilic moiety to interface with the polar surfaces of the clay platelets, and a non-polar moiety to interface with the non-polar, hydrophobic olefin monomers, oligomers, and polymers. Exemplary incalants include organic ammonium salts that have a positively-charged quaternary ammonium moiety bonded to a hydrocarbon chain such as a $C_4$-$C_{18}$ alkyl group. The incalants may be delivered to the nanoclays through a solvent that permits the fluid dispersion of the incalants to the interlaminar surfaces of the platelets.

As noted above, the dispersed nanoclay platelets may have thicknesses on the order of a nanometer (e.g., about 0.3-5 nm) with much larger height and width dimensions (e.g. about 1 to 100 μm) to give the platelets a large aspect ratio (where aspect ratio is defined as the ratio of the longest dimension to the shortest dimension of the particle). The high aspect ratio of the platelets combined with their increased impermeability to oxygen forces oxygen molecules in the polymer matrix to traverse tortuous paths that slows the overall oxygen permeability of the polymer nanocomposite.

Exemplary smectite nanoclays may include montmorillonites, bentonites, nontronites, beidellites, volkonskoites, hectorites, saponites, sauconites, sobockites, stevensties, and svinfordites, among others. Specific examples include sodium montmorillonite calcium montmorillonite sodium bentonite, and calcium bentonite.

The nanoparticle tiller materials may also include nanotubes, such a mineral nanotubes and carbon-containing nanotubes. Exemplary mineral nanotubes include halloysite nanotubes, which have a generally cylindrical shape. The halloysite nanotubes are produced from aluminosilicate clays that form distinct alumina and silica bilayers with different lattice structures. The different lattice structures of the adjacent layers cause the otherwise planer sheets of halloysite to curl into scroll-like nanotubes. Exemplary carbon-containing nanotubes include carbon nanotunes (CNTs) formed from sheets of graphene carbon. These carbon nanotubes include single-walled nanotubes (SWNTs) and multi-walled nanotubes (MWNTs).

The nanoparticle filler materials may still further include metal oxide nanoparticles. These may include particles with a roughly spherical and/or capsule shape and sizes ranging from fine nanoparticles (e.g., about 2,500 to 100 nm in diameter), to ultrafine nanoparticles (e.g., about 100 to 1 nm in diameter). Exemplary metal oxide nanoparticles may include titanium dioxide (TiO), alumina ($Al_2O_3$), zirconia ($ZrO_2$), and silica ($SiO_2$), among other metal oxides.

The present polymer compositions may optionally further include larger filler materials, UV stabilizers, anti-oxidants, heat stabilizers, anti-blocking agents, anti-foaming agents, blowing agents, anti-fungal agents, anti-microbial agents, pigments, dyes, anti-fogging agents, flame and fire retardants, and colorants, among other additives.

Exemplary larger filler materials that may optionally be added in addition to the nanoparticle fillers include glass fibers (both long and short), talc, mica, wollastonite, metal particles, metal oxide particles (e.g., titanium oxide, alumina), metal carbonate particles, metal hydroxide particles, silicon carbide, silica, silicon dioxide, calcium silicate, calcium and barium sulfate, calcite ($CaCO_3$), quartz, spinel, apatite, and dolomite, among other filler materials.

The present polymer compositions may also optionally include a compatibilizer to increase the efficiency of intercalation, exfoliation and dispersion of the nanoparticles in the polymer matrix. Exemplary compatibilizers may include a modified polyolefin such as a maleic anhydride-modified polyolefin that increase the polarity of the olefin polymer matrix (e.g., a polypropylene resin) to better match the more polar nanoparticle filler.

The present polymer compositions may further optionally include coupling agents to increase the adhesion between the filler material and the surrounding polymer matrix. In some instances these coupling agents may improve mechanical properties, such as tensile strength, of composites made with the compositions. Exemplary coupling agents may include organosilanes, epoxy resins, organic esters, an organic anhydrides grafted onto olefin polymers, among others.

Exemplary Polymer Nanocomposites and Methods of Making

The present polymer compositions that include nanoparticle filler in a olefin polymer matrix may be used to make polymer nanocomposites, such as nanocomposite films. The films may include a single layer, or multiple layers depending on the final product. For example, the film may include both a core layer made from a first polymer composition and a capping layer made from a second polymer composition that may further include nanoparticles. In some instances, a film layer may be added to the capping and core layers that includes nanoparticles in addition to (or in lieu of) the capping layer.

The films may have dimensions ranging from, for example, about 0.1 mm to about 2 mm in thickness, and about 10 cm to about 200 cm in width. Layer thickness is often measured in mils where 1 mm is equivalent to about 39.4 mils. For example, a roofing membrane may have a total thickness ranging from about 45 mils to about 80 mils. An exemplary roofing membrane with a thickness of about 45 mils may include a core and cap layer of approximately equal thickness (i.e., about 22-23 mils each). If the roofing membrane further includes a film layer laminated on the cap layer, the film layer may be about 1 mil thick.

The films may be rolled for ease of storage and transport, so the length of the film may vary depending on the size of the roll. Tailored pieces of the nanocomposite film may be cut from larger sheets at a worksite, or may be fabricated to the desired dimensions at the manufacturing site.

Exemplary films include solid sheets as well as membranes with openings, depending on the film's ultimate function. The films may also be unreinforced, or be incorporated with a reinforcing material such as mesh, screen, threads, or attached covering, among other reinforcement materials.

Figure 2:
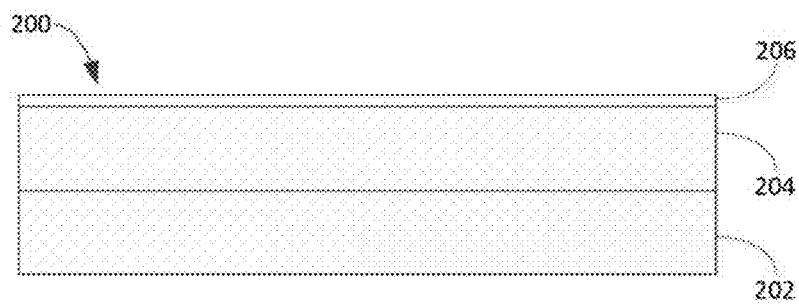
FIG. 2 illustrates a polymer nanocomposite film layer according to embodiments of the invention.

FIG. 2 illustrates a polymer nanocomposite layer 200 according to embodiments of the invention. As noted above, the layer 200 may be a single layer (not shown) or a plurality of two or more layers as illustrated in FIG. 2. Layer 200 includes a core layer 202 that may be formed from an organic polymer material such as TPO. In the embodiment shown, the core layer 202 does not include a nanoparticle filler material, but may include other types of fillers in the polymer matrix. Some or all of the polymer used in core layer 202 may be recycled polymer, such as recycled thermoplastic polyolefin that was cut and melted from a different article (e.g. a plastic bottle).

Layer 200 further includes a cap layer 204 that may be formed from the same or different polymer materials then the core layer 202. The cap layer 204 may also include the nanoparticle filler that may substitute for some or all of the conventional stabilizers and UV blockers typically added to the layer. Cap layer 204 may be made from virgin polymer that provides more uniform consistency of the physical and chemical characteristics of the layer (e.g., moisture resistance, weathering resistance, abrasion resistance, etc.) as it faces direct exposure to sunlight, air, and pollutants in applications like roofing membranes.

The layer 200 may also optionally include a thin film layer 206 that is laminated on top of the cap layer 204. As described above, the thin film layer 206 is a thin layer of the nanoparticles held in a polymer matrix that may substitute for some or all of the nanoparticles in the cap layer 204. The thickness of the film layer 206 may range, for example, from 1 to 5 mils.

The film layer 200 may be a rectangular-shaped sheet with sufficient flexibility to be flexed and unrolled. Depending on the formulation of the polymer composition used to make the film layer 200, the film may be translucent or opaque, colored or colorless, and reflective or non-reflective to sunlight, among other optical qualities.

The methods of making the polymer nanocomposites can take a variety of routes. For example, the starting ingredients, including the olefin monomers, nanoparticle fillers, and any additional additives may be combined and reacted in a large vessel to make the polymer composition for the polymer nanocomposite. In additional examples, components of the starting ingredients may be separately reacted or processed into a final set of ingredients that are combined and reacted into the polymer composition. For example, if nanoclays are used as the nanoparticle filler, the clays may be treated with an incalant and mechanically processed (e.g., sheared) before being combined with the bulk polymer resin to make the final polymer composition. In additional examples, the olefin monomers may be polymerized and pelleted before being melted and mixed with fillers and other ingredients in a mixing vessel.

Figure 3:
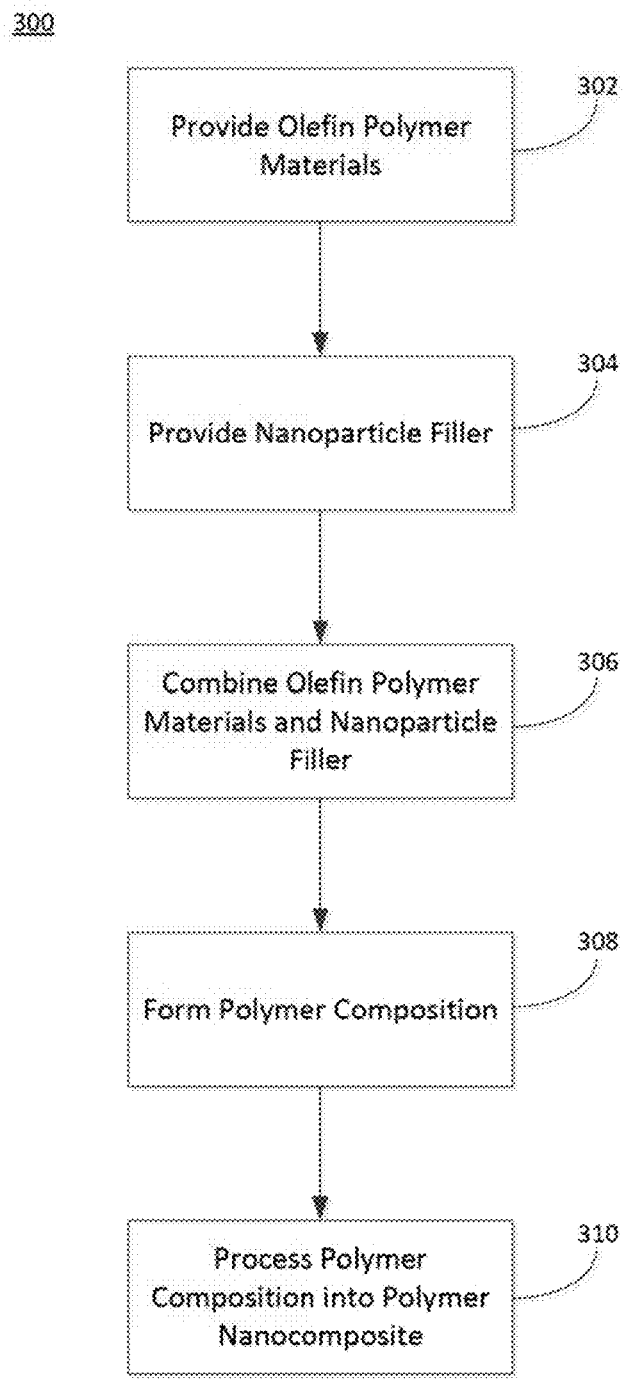
FIG. 3 is a flowchart with selective steps in a method of making a polymer nanocomposite according to embodiments of the invention.

FIG. 3 shows selective steps in a method 300 of making exemplary nanocomposites, such as a nanocomposite film, according to embodiments of the invention. The method 300 may include the step of providing the olefin polymer materials 302 and the nanoparticle filler materials 304 that make up at least part of the polymer composite. As noted above, these materials may be provided as unreacted starting monomers and untreated nanoparticles, or they may have already undergone some processing (e.g., polymerization, intercalatation, etc.). The olefin polymer materials and nanoparticle filler may then be combined 306, for example in a mixing, heating, and/or reaction vessel. The combined materials may be mixed, reacted, melted, polymerized, etc., to form the final polymer composition 308.

The polymer composition may then be immediately processed into the polymer nanocomposite 310 by, for example, blowing, calendering, molding, extruding, etc., the polymer composition into the final form of the nanocomposite (e.g., a nanocomposite film). In one example, the nanoparticle composition may be formed into a first layer and calendered to a second polymer layer that does not contain a nanoparticle filler to form a two-layer sheet. The calendering process may include pressing the two layers between a pair of heated ropers, thereby bonding the layers together. In a further example, the two-layer sheet may optionally be calendered to a third, thin-film nanocomposite layer.

Exemplary Articles Made with Polymer Nanocomposites

Figure 4:
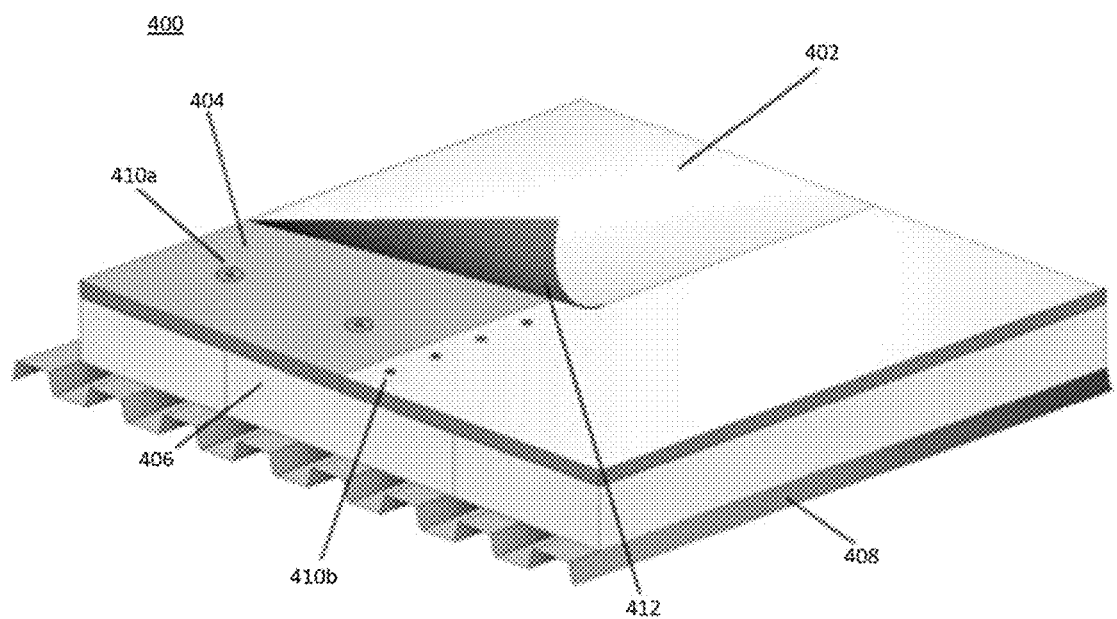
FIG. 4 is a simplified schematic of a roofing system that includes a polymer nanocomposite layer according to embodiments of the invention.

The present polymer nanocomposites may be fashioned into coverings for the surfaces of buildings. For example, FIG. 4 illustrates cross-sectional view of a roofing system 400 that includes a top cover layer 402 made from a film of the present polymer nanocomposites. In the embodiment shown, the cover layer 402 has a top surface facing direct exposure to the elements and an opposite surface in contact with a roofing board layer 404, which may include, for example, a high-density polymer core (e.g., high-density polyisocyanurate) faced with a glass-fiber reinforced facer material. Exemplary roofing board materials may include Invinsa® roof board made by Johns Manville, Inc, of Denver, Colo.

The roofing board layer 404 may be positioned between the cover layer 402 above and an insulation layer 406 that makes direct contact with the deck of the roof 408. The insulation layer 406 may include insulation materials such as a closed cell polyisocyanurate foam board insulation material, commercially available as Energy3® rigid roof insulation from Johns Manville, Inc. of Denver, Colo.

In the embodiment shown, fasteners 410a (e.g., nails, screws, etc.) are used to attach the roofing board layer 404 to the underlying insulation layer 406. Fasteners may also be used to attach the top cover layer 402 to the roofing board layer 404. In addition to for in lieu of) fasteners, adhesives 412 may be applied to the contacting surfaces of the adjacent layers to hold the layers together.

EXAMPLES

The TPO compositions described above can be formed into a series of TPO nanocomposite films having a thickness of 0.02 mm to 2 mm or more. The films have varying concentrations of an organoclay nanocomposite ranging from a comparative film with no nanoclay filler, films with 2 wt. % to 5 wt. % of the nanoclay filler, and films containing nanoclay filler in at levels less than 2 wt. % and in excess of 5 wt. %.

Figure 5:
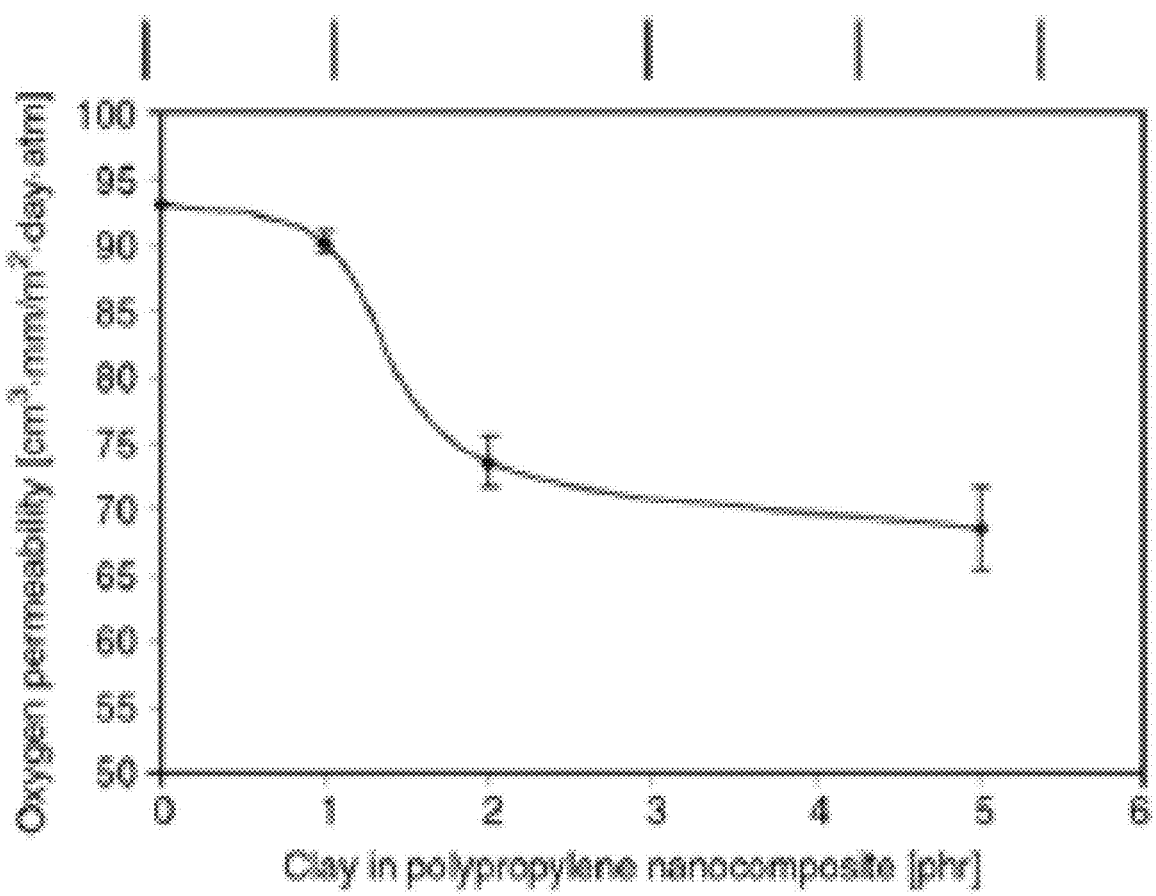
FIG. 5 is a graph of oxygen permeability through a film of the present polymer nanocomposites as a function of the nanoparticle concentration.

The films can be tested for oxygen permeability. FIG. 5 is a graph of oxygen permeability through a film of the present polymer nanocomposites as a function of the nanoparticle concentration in parts-per-hundred (phr). The graph shows a significant reduction in the oxygen permeability of the film when the nanoparticle concentration ranges from about 2 wt. % to about 5 wt. %. However, when the nanoparticle concentration is about 5 wt. % the rate of reduction in oxygen permeability tapers off significantly. A nanoparticle concentration in a range of 2 wt. % to 5 wt. % is all that is necessary to achieve significant reductions in the oxygen permeability of the film. Thus, loading the polymer nanocomposite film with significantly more than 5 wt. % nanoparticles is unnecessary to achieve further large reductions in a film's oxygen permeability, and may be economically counterproductive.

The reduced oxygen permeability reduces the film's rate of degradation due to polymer oxidation by the free oxygen, which in turn increases the useful lifespan of the film. A reduction in the rate of oxygen degradation is especially significant for films utilized as protective weather barriers exposed long periods of time (e.g., years) to high temperatures and intense sunlight.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range.

Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the composite" includes reference to one or more composites and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A polymer composition with reduced oxygen permeability, the polymer composition comprising:
    one or more thermoplastic olefin polymers, wherein the thermoplastic olefin polymers comprise polyethylene or polypropylene; and
    one or more cyclic olefin copolymers comprising an acyclic olefin and a cyclic olefin, wherein the polymer composition has about 2 wt. % to about 5 wt. % cyclic olefin copolymers, and wherein the only cyclic olefins in the polymer composition are found in the one or more cyclic olefin copolymers;
    2 wt. % to 5 wt. % of nanoparticle filler treated with an intercalant comprising a polar, hydrophilic moiety to interface with the polar surfaces of the nanoparticle filler and a non-polar moiety to interface with non-polar, hydrophobic olefin monomers, oligomers, and polymers; and
    a stabilizer to slow the degradation caused by oxidation or to absorb ultra-violet radiation.

2. The polymer composition of claim 1, wherein the cyclic olefin comprises norbornene or tetracyclododecene, and the acyclic olefin comprises ethylene or propylene.

3. The polymer composition of claim 1, wherein the nanoparticle filler is selected from the group consisting of nanoclays, carbon-containing nanotubes, and metal oxide nanoparticles.

4. The polymer composition of claim 1, wherein the nanoparticle filler is nanoclay platelets.

5. The polymer composition of claim 4, wherein the nanoclay platelets have a thickness from 0.3 nm to 5 nm, a height from 1 μm to 100 μm, and a width from 1 μm to 100 μm.

6. The polymer composition of claim 1, wherein the nanoparticle filler is titanium dioxide nanoparticles.

7. The polymer composition of claim 1, wherein the stabilizer is present in an amount from 2 wt. % to 5 wt. % by weight of the polymer composition.

8. The polymer composition of claim 1, wherein the nanoparticle filler comprises a nanoclay comprising bentonites, nontronite, beidellite, volkonskoite, hectorite, saponite, sauconite, sobockite, stevensite, svinfordite, and combinations thereof.

9. A polymer nanocomposite comprising:
    a film treated with an intercalant comprising a polar, hydrophilic moiety to interface with the polar surfaces of the nanoparticle filler and a non-polar moiety to interface with non-polar, hydrophobic olefin monomers, oligomers, and polymers comprising a thermoplastic polyolefin matrix and a nanoparticle filler, wherein the nanoparticle filler is 2 wt. % to 5 wt. % of the polymer nanocomposite, and wherein the nanoparticle filler reduces the oxygen permeability of the film by about 20% or more,
    wherein the thermoplastic polyolefin matrix comprises:
    one or more thermoplastic olefin polymers comprising polyethylene or polypropylene; and
    one or more cyclic olefin copolymers comprising an acyclic olefin and a cyclic olefin, wherein the thermoplastic polyolefin matrix has about 2 wt. % to about 5 wt. % cyclic olefin copolymers, and wherein the only cyclic olefins in the thermoplastic polyolefin matrix are found in the one or more cyclic olefin copolymers.

10. The polymer nanocomposite of claim 9, wherein the thermoplastic polyolefin polymers consist of polyethylene or polypropylene.

11. The polymer nanocomposite of claim 9, wherein the cyclic olefin comprises norbornene or tetracyclododecene, and the acyclic olefin comprises ethylene or propylene.

12. The polymer nanocomposite of claim 9, wherein the nanoparticle filler is selected from the group consisting of nanoclays, carbon-containing nanotubes, and metal oxide nanoparticles.

13. The polymer nanocomposite of claim 9, wherein the nanocomposite comprises a roofing membrane to reduce underlying roofing materials from weather degradation.

14. A roofing system comprising:
    an insulation layer;
    a thermoplastic polyolefin layer positioned over the insulation layer to protect the insulation layer from weather degradation, wherein:
    the thermoplastic polyolefin layer comprises:
    a thermoplastic polyolefin matrix, and
    2 wt. % to 5 wt. % of nanoparticle filler treated with an intercalant comprising a polar, hydrophilic moiety to interface with the polar surfaces of the nanoparticle filler and a non-polar moiety to interface with non-polar, hydrophobic olefin monomers, oligomers, and polymers; wherein
    the thermoplastic polyolefin matrix comprises:
    one or more thermoplastic olefin polymers, wherein the one or more thermoplastic olefin polymers comprise polyethylene or polypropylene;
    one or more cyclic olefin copolymers, wherein about 2 wt. % to about 5 wt. % of the thermoplastic polyolefin matrix is the one or more cyclic olefin copolymers, and wherein the only cyclic olefins in the thermoplastic polyolefin layer are found in the one or more cyclic olefin copolymers; and
    a stabilizer,
    wherein the nanoparticle filler reduces the oxygen permeability of the thermoplastic polyolefin layer by about 20% or more.

15. The roofing system of claim 14, wherein the insulation layer comprises a polyisocyanurate-containing insulation.

16. The roofing system of claim 14, wherein the nanoparticle filler is a nanoclay.

17. The roofing system of claim 14, wherein the roofing system further comprises a roofing board layer positioned between the insulation layer and the thermoplastic polyolefin layer.

18. The roofing system of claim 17, wherein the roofing board layer comprises a high-density polymer core that includes a high-density polyisocyanurate, and wherein the roofing board layer is faced with a glass-fiber reinforced facer material.

19. The roofing system of claim 17, wherein the roofing board layer is mechanically fastened to the insulation layer.

20. The roofing system of claim 17, wherein the thermoplastic polyolefin layer is also adhesively attached to the roofing board layer.

* * * * *